No. 738,867. PATENTED SEPT. 15, 1903.
H. P. WILMARTH.
NAIL PULLER FOR TIRES.
APPLICATION FILED MAR. 5, 1903.
NO MODEL.
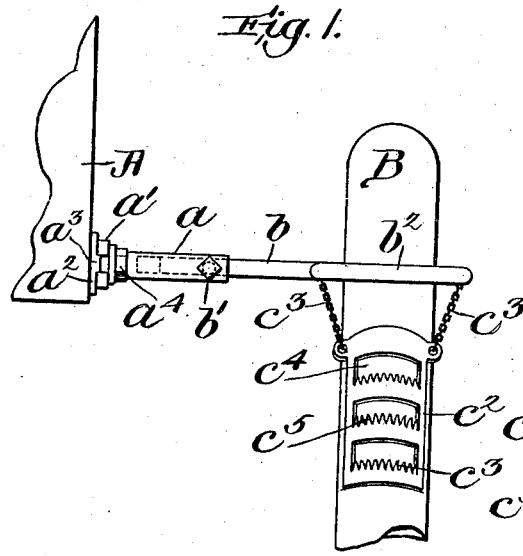
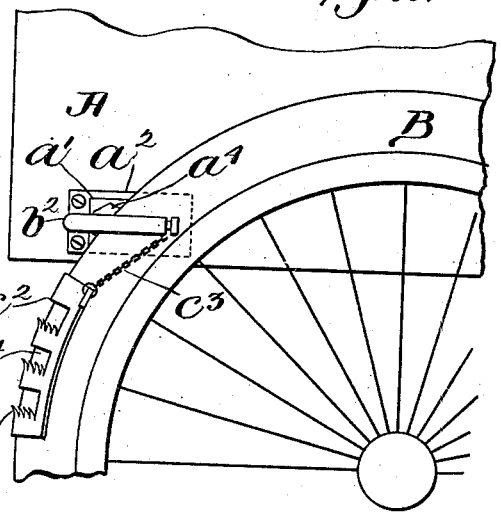
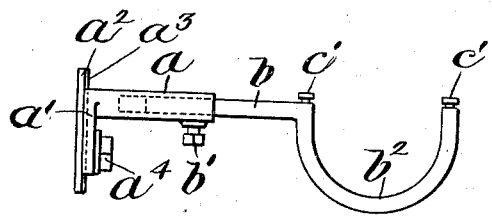
Witnesses:
Josephine H. Ryan.
E. D. Chadwick.
Inventor:
Henry P. Wilmarth
by Roberts & Mitchell
Attorneys.

No. 738,867.

Patented September 15, 1903.

UNITED STATES PATENT OFFICE.

HENRY P. WILMARTH, OF ATTLEBORO, MASSACHUSETTS.

NAIL-PULLER FOR TIRES.

SPECIFICATION forming part of Letters Patent No. 738,867, dated September 15, 1903.

Application filed March 5, 1903. Serial No. 146,307. (No model.)

*To all whom it may concern:*

Be it known that I, HENRY P. WILMARTH, a citizen of the United States, and a resident of Attleboro, in the county of Bristol and State of Massachusetts, have invented new and useful Improvements in Nail-Pullers for Tires, of which the following is a specification.

My invention relates to devices for pulling nails, tacks, splinters of metal or wood, glass, and other like objects from the tires of wheels; and its object is to provide an attachment which can be applied to any vehicle having wheels provided with pneumatic, rubber, or other soft tires capable of pulling from the tires, and thus protecting them from injury, any sharp objects of the character above mentioned which are apt to be picked up by the tire in the road and are calculated to perforate or puncture the tire.

It is well known to the users of automobiles, bicycles, or other carriages or vehicles having pneumatic or rubber tires that nails, tacks, and other sharp articles lying in the road are readily picked up by the tires as the wheel passes along the road and unless removed will eventually perforate and in the case of a pneumatic tire puncture the tire, thus either destroying it altogether or rendering it unfit for use until it can be repaired. It is also well known that sharp objects, like nails or tacks, when first inserted and picked up by the tire will rarely penetrate far enough to cause a puncture or serious damage, but that by the repeated impact against the ground as the wheel revolves such articles will presently be driven in, causing a deeper and deeper penetration and finally a complete puncture. If the nail or other sharp object can be pulled out upon the first revolution of the wheel, or even during the first few revolutions and before the article is driven deep into the tire, no damage will result. To accomplish this result is the object of my invention, and as my device is peculiarly adaptable to and most serviceable when used in connection with pneumatic tires I will address my description to its use in that connection. I desire it to be clearly understood, however, that it is not limited to use in connection with pneumatic tires, but is applicable to all soft tires and to all vehicles having such tires.

In the accompanying drawings, which show certain embodiments of my invention, Figure 1 represents in front elevation one form of my device applied to the tire of a carriage, only such parts of the carriage being shown as are necessary for an understanding of my attachment. Fig. 2 is an end view of the device shown in Fig. 1. Fig. 3 is a plan view of a bracket forming a part of the device shown in Figs. 1 and 2.

My invention is a device for pulling nails, tacks, and other articles from the tire of a wheel and comprises a plate for engaging the tire suspended by a movable pendant loosely connected at its upper end to the frame or body of the vehicle and by which the plate is held opposite the tire in such manner that the weight of said pendant and plate is utilized to hold the plate yieldingly against or upon the tire. In the best form of my invention two pendants are provided, loosely fastened at their upper ends to a bracket of novel construction, that is fixed to the body of the vehicle, and the lower end of one pendant is fastened to one side of the plate and the corresponding end of the other pendant is fastened to the opposite side of the plate.

Other features of my invention are hereinafter pointed out.

Referring to the drawings, A represents the body of a carriage, such as an automobile. B represents the pneumatic tire of a wheel upon said carriage. Secured to the body A of the carriage is a bracket adapted to support the puller in contact with the wheel B and made in two sections $a$ and $b$. The inner section $a$ is a socket adjustably secured to the body of the carriage, as shown, by the upturned portion $a'$, which is mounted upon a plate $a^2$, provided with a guideway $a^3$ and secured to the body A of the carriage by screws or any suitable means. The part $a'$ has a sliding engagement upon the guideways $a^3$ and may be secured in the desired position by any suitable means, such as a set-screw or bolt $a^4$. The part $b$ is secured to the part $a$ in such manner as to be longitudinally adjustable thereon. This may be accomplished, as shown in the drawings, by making the part $a$ tubular in form and inserting the part $b$ in the tube, where it may be secured by any suitable means, as the set-screw or nut $b'$. By making the support or bracket adjustable longitudinally it may be applied to carriages whose wheels are various distances from the bodies. Furthermore, it may be adjusted to any changed spread or gage of the wheels due to tightening or loosening the bearings. The adjustment of the brackets on the body or frame of the vehicle is desirable to attain varying degrees of pressure of the puller to meet the requirements of varying conditions.

The outer end of part $b$ is provided with a bow or curved section $b^2$, adapted to partially encircle the tire B of the wheel and so to hold the puller in proper relationship with the tire.

$c^2$ is the puller, consisting of a plate supported by two pendent chains $c^3$, each fastened at its lower end to one side of plate $c^2$ and at its upper end hung loosely to one end of the bow $b^2$ by a screw $c'$.

The plate $c^2$ is curved both laterally and longitudinally, as shown, to conform to the shape of the tire B and is provided with a series of apertures $c^4$, the lower edges of which are made in the form of teeth $c^5$ turned slightly outwardly, so that as the wheel rotates the teeth shall not wear or tear the tire B.

As the wheel of the vehicle rotates the plate will rest lightly against the tire and will catch and pull out from the tire any sharp article which has partially penetrated the tire and is protruding therefrom and prevent the same from being driven farther into the tire by the repeated impact which would otherwise be given it as the wheel passes over the ground. As the puller is flexibly suspended from its support, it is obvious that it will yield sufficiently to allow for any irregularities in the tire or any relative motion between the tire and the body of the vehicle to which the bracket is fastened and will retain a light but substantially constant pressure against the tire and will always be in engagement therewith, ready to extract a nail or other perforating object.

The operation of my device will be obvious from the foregoing. The protruding and puncturing object which may have entered the tire will be removed by the plate when that form of puller is used as the tire passes under it.

What I claim, and desire to secure by Letters Patent, is—

1. A device for pulling nails, tacks and other articles from the tire of a wheel comprising a plate for engaging the tire; a movable pendent support for the plate joined at its lower end to the plate and loosely connected at its upper end to the body or frame of the vehicle, said pendant being arranged and adapted to hold the plate opposite the tire and to utilize the weight of said pendant and plate to hold the latter yieldingly against the tire.

2. A device for pulling nails, tacks and other articles from the tire of a wheel comprising a plate for engaging the tire, and a pair of movable pendent supports for the plate each loosely fastened at its upper end to the body or frame of the vehicle, one of said supports being joined at its lower end to one side of said plate, and the other joined at its lower end to the opposite side of said plate, said supports arranged and adapted to jointly hold the plate opposite the tire and to utilize the weight of said supports and said plate to hold the latter yieldingly against the tire.

3. A device for pulling nails, tacks, and other articles from the tire of a wheel comprising a bracket fixed to the body or frame of the vehicle having its outer end arranged adjacent to and across the tire of the wheel at a point above the axis of the latter; a plate for engaging the tire, and a pair of movable pendent supports for the plate, one loosely fastened at its upper end to the bracket at one side of the tire and at its lower end to one side of the plate, and the other loosely fastened at its upper end to the bracket at the opposite side of the tire and at its lower end to the opposite side of the plate, said pendent supports and bracket arranged and adapted to jointly hold the plate opposite the tire and to utilize the weight of said supports and plate to hold the latter yieldingly against the tire.

4. A device for pulling nails, tacks, and other articles from the tire of a wheel comprising a bracket fixed to the body or frame of the vehicle having its outer end made in the form of a bow extending around the tire of the wheel at a point above the axis of the latter; a plate for engaging the tire; and a pair of movable pendent supports for the plate, one loosely fastened at its upper end to one end of the bow and at its lower end to one side of said plate, and the other loosely fastened at its upper end to the opposite end of the bow and at its lower end to the opposite side of the plate, said supports and bracket adapted to jointly hold the plate opposite the tire and to utilize the weight of said supports and plate to hold the latter yieldingly against the tire.

5. As a new article of manufacture a device for pulling nails, tacks and other articles from the tire of a wheel comprising a bracket adapted to be fixed to the body or frame of the vehicle having its outer end made in the form of a bow to extend around the tire of the wheel at a point above the axis of the latter, and a movable pendent scraper loosely connected with the ends of said bow and arranged to be held by its own weight yieldingly against the tire.

6. As a new article of manufacture, a device for pulling nails, tacks and other articles from the tire of a wheel comprising an extensible bracket made in two separable parts, one of said parts consisting of a socket adapted to be fixed to the body or frame of the vehicle and the other part consisting of a bow having a shank adjustably fastened in the socket; a plate for engaging the tire of the wheel, and a pair of movable pendent supports for the plate, one loosely fastened at its upper end to one end of the bow and at its lower end to one side of said plate, and the other loosely fastened at its upper end to the opposite end of the bow and at its lower end to the opposite side of the plate, said supports and bracket adapted to jointly hold the plate opposite the tire and to utilize the weight of said supports and plate to hold the latter yieldingly against the tire.

7. As a new article of manufacture, a device for pulling nails, tacks and other articles from the tire of a wheel comprising an extensible bracket made in two separable parts, one of said parts consisting of a socket adapted to be fixed to the body or frame of the vehicle and the other part consisting of a bow having a shank adjustably fastened in the socket; a longitudinally and transversely curved plate for engaging the tire of the wheel, and a pair of movable pendent supports for the plate one loosely fastened at its upper end to one end of the bow and at its lower end to one side of said plate, and the other loosely fastened at its upper end to the opposite end of the bow and at its lower end to the opposite side of the plate, said supports and bracket adapted to jointly hold the plate opposite the tire and to utilize the weight of said supports and plate to hold the latter yieldingly against the tire.

Signed by me at Boston, Suffolk county, Massachusetts, this 26th day of February, 1903.

HENRY P. WILMARTH.

Witnesses:
ROBERT CUSHMAN,
JOSEPH T. BRENNAN.